(12) United States Patent
Pavlich et al.

(10) Patent No.: US 12,185,847 B2
(45) Date of Patent: Jan. 7, 2025

(54) BULK FOOD DISPENSER AUTOMATION

(71) Applicant: Trade Fixtures, LLC, Little Rock, AR (US)

(72) Inventors: Craig Pavlich, Glen Ellyn, IL (US); Christopher Lyons, Western Springs, IL (US); Austen Siwiec, Naperville, IL (US)

(73) Assignee: Trade Fixtures, LLC, Little Rock, AR (US)

( * ) Notice: Subject to any disclaimer, the term of this patent is extended or adjusted under 35 U.S.C. 154(b) by 261 days.

(21) Appl. No.: 17/694,001

(22) Filed: Mar. 14, 2022

(65) Prior Publication Data

US 2022/0296009 A1  Sep. 22, 2022

Related U.S. Application Data

(60) Provisional application No. 63/161,734, filed on Mar. 16, 2021.

(51) Int. Cl.
*A47F 3/02* (2006.01)
*B65G 65/00* (2006.01)
*G01F 11/46* (2006.01)
*G06Q 30/0283* (2023.01)
*G07F 17/00* (2006.01)

(52) U.S. Cl.
CPC .............. *A47F 3/02* (2013.01); *B65G 65/005* (2013.01); *G01F 11/46* (2013.01); *G06Q 30/0283* (2013.01); *G07F 17/0064* (2013.01)

(58) Field of Classification Search
CPC . A47F 1/03; A47F 1/035; G01F 11/34; G01F 11/40; G01F 11/46
See application file for complete search history.

(56) References Cited

U.S. PATENT DOCUMENTS

| | | |
|---|---|---|
| 4,473,175 A | 9/1984 | Zengaffinen et al. |
| 4,903,866 A | 2/1990 | Loew |
| 5,285,925 A | 2/1994 | Leight |

(Continued)

FOREIGN PATENT DOCUMENTS

| | | |
|---|---|---|
| CA | 3048200 A1 | 12/2019 |
| EP | 3669707 A1 | 6/2020 |
| EP | 3542678 B1 | 11/2020 |

OTHER PUBLICATIONS

European Search Report for European Patent Application No. 22162562.7, dated Jul. 28, 2022.

*Primary Examiner* — Timothy L Maust
(74) *Attorney, Agent, or Firm* — Andrus Intellectual Property Law, LLP (57) ABSTRACT

A bulk food product gravity-feed dispenser includes a compartment configured to receive and store bulk food material. A valve separates the compartment from an outlet. The valve operates to open and close to selectively permit bulk food material to pass from the compartment through the outlet. An electromechanical motor is communicatively connected to a controller and mechanically connected to the valve. The controller operates in response to receipt of a dispense instruction input to produce a control signal to the electromechanical motor. The electromechanical motor operates to move the valve between a closed position and an open position to dispense a portion of the bulk food material.

19 Claims, 9 Drawing Sheets

(56) References Cited

U.S. PATENT DOCUMENTS

| | | | | |
|---|---|---|---|---|
| 5,301,848 A * | 4/1994 | Conrad | ............... | F16K 31/0655 |
| | | | | 251/129.21 |
| 5,437,393 A | 8/1995 | Blicher et al. | | |
| 6,182,864 B1 | 2/2001 | Elmore | | |
| 6,241,123 B1 | 6/2001 | Elmore | | |
| 6,705,356 B2 * | 3/2004 | Barton | ................... | B67D 1/124 |
| | | | | 141/2 |
| 7,178,697 B2 | 2/2007 | Brundick et al. | | |
| 8,708,199 B2 * | 4/2014 | James | ..................... | G07F 9/105 |
| | | | | 222/541.9 |
| 8,870,024 B2 | 10/2014 | Mendes et al. | | |
| 10,450,152 B2 * | 10/2019 | Brundick | .............. | B65G 65/489 |
| 10,665,051 B2 * | 5/2020 | Conway | ................... | G07F 11/44 |
| 11,051,636 B2 | 7/2021 | Sunesson et al. | | |
| 2004/0129341 A1 * | 7/2004 | Anderson | ................ | B67D 1/06 |
| | | | | 141/268 |
| 2013/0126042 A1 * | 5/2013 | Dewald | ................... | G07F 11/44 |
| | | | | 141/105 |
| 2016/0009539 A1 * | 1/2016 | Jersey | .................... | B67D 1/004 |
| | | | | 222/460 |
| 2019/0092617 A1 | 3/2019 | Brundick et al. | | |
| 2020/0043274 A1 * | 2/2020 | Hone | ....................... | G07F 17/20 |
| 2020/0090114 A1 | 3/2020 | Conway | | |
| 2020/0189836 A1 | 6/2020 | Sunesson et al. | | |
| 2020/0193758 A1 | 6/2020 | Conway | | |
| 2020/0405075 A1 * | 12/2020 | Mackay | .................. | A47F 10/02 |
| 2021/0106147 A1 | 4/2021 | Sunesson et al. | | |

* cited by examiner

BULK FOOD DISPENSER AUTOMATION

CROSS-REFERENCE TO RELATED APPLICATIONS

The present application claims priority of U.S. Provisional Patent Application No. 63/161,734 filed on Mar. 16, 2021, the contents of which is hereby incorporated by reference in its entirety.

BACKGROUND

The present disclosure relates to the field of bulk dispensing bins, particularly those for use by consumers at point-of-sale installations. More specifically, the present disclosure relates to features to limit direct contact between a user and the dispenser.

Bulk dispensers, and more particularly gravity-feed bulk dispensers, are known and used in commercial settings for self-service portioning of bulk materials, for example, foods. Traditionally, gravity feed bins for dispensing bulk materials are used to dispense a wide variety of materials having a range of sizes and aggregate make-ups as diverse as hardware components (e.g. nuts and bolts) or food (e.g. nuts, cereals, grains, pastas, coffee (beans or ground), dried soup mix, candies, spices). Generally, the bins include an enclosure having an inlet at an upper end through which the enclosure is filled, an outlet at a lower end for dispense of the material, and a flow control device located between the upper and lower openings for controlling the amount of materials being dispensed. In operation, as the material is being dispensed, gravity pulls the remaining material in the enclosure towards the lower end to replace dispensed material. These types of bins generally include a downwardly curving inner wall that forms a chute to channel the dispensed materials in a receptacle adjacent the outlet.

Examples of known gravity feed bins are found in U.S. Pat. No. 4,903,866 entitled, "Gravity Dispensing Bin System"; U.S. Pat. No. 5,437,393, entitled, "Apparatus for Delivering Bulk Foods"; U.S. Pat. No. 6,182,864 entitled, "Bulk Food Dispensing Apparatus"; U.S. Pat. No. 6,241,123 entitled, "Bulk Food Dispensing Apparatus"; U.S. Pat. No. 7,178,697 entitled, "Agitator Assisted Bulk Product Dispenser"; U.S. Pat. No. 10,450,152 entitled, "Expandable Gravity-Feed Bin"; and US Pat. App. Pub. No. 2019/0092617 entitled, "Expandable Gravity-Feed Bin." Each of these are incorporated by reference in their entireties.

BRIEF DISCLOSURE

An example of a bulk food product gravity-feed dispenser for use by customers in a retail setting includes a compartment configured to receive and store bulk food material. A valve separates the compartment from an outlet. The valve is operable to open and close to selectively permit bulk food material to pass from the compartment through the outlet of the outlet. A controller is configured to, upon operation of the valve, calculate an estimated dispense amount and an estimated dispense price. A graphical display is operable by the controller to present a visual indication of the estimated dispense amount and the estimated dispense price.

In examples, a spout extends away from the compartment and opens at an outlet. In examples, the valve may be a fixed displacement valve or a flow metering valve. The electromechanical motor may be connected to the valve by a linkage. The controller and the electromechanical motor may be located within a dispenser base defining a housing, wherein the dispenser base is configured to secure to the compartment. An agitator may be movably positioned within the compartment. The agitator is configured for mechanical attachment to the electromechanical motor. A linkage may mechanically connect the electromechanical motor to the agitator, such that operation of the electromechanical motor in response to the controller to operate the valve between the closed and open positions further operates the agitator to move within the compartment.

Examples of the bulk food product gravity-feed dispenser may include a graphical display. The graphical display may be operable by the controller to present a visual indication of an estimated dispense amount and an estimated dispense price. The valve may be a flow metering valve and the controller may be configured to calculate the estimated dispense amount from a measured duration in which the valve is in the open position and a predetermined mass flow rate of the bulk food material. The valve may be a fixed displacement valve and the portion is a fixed portion dispensed upon each actuation of the valve. The controller may be configured to calculate the estimated dispense amount from the fixed portion and a count of sequential actuation of the valve. A user input sensor may be configured to receive the dispense instruction input. The user input sensor may be configured to receive a user gesture or proximity, configured as an RFID sensor to receive a signal from an RFID tag associated with a customer, or configured as a physical or graphical user interface button.

The bulk food product gravity-feed dispenser may further include a sensor arranged proximate an outlet of the spout of the dispenser, wherein the sensor produces the dispense instruction input. The sensor may include an infrared sensor configured to detect a proximity of a receptacle below the spout. The sensor may include one of a ranging sensor, a proximity sensor, or a camera and computer vision processing system operating on the controller. A visible light source may be configured as a visual indicator of the status of the dispenser. The visible light source may be arranged proximate the outlet of the spout of the dispenser and configured to illuminate an area below the spout. An adapter ring may be removably secured about the spout. The adapter ring may include the sensor and the visible light source and position the sensor and the visible light source proximate the outlet of the spout.

In further examples of the bulk food product gravity-feed dispenser, a visible light source is a visual indicator of the status of the dispenser. The visible light source may be connected to the spout and configured to illuminate an area below the spout. The visible light source may be configured to produce at least one of: a first color to indicate a standby operation; a second color to indicate the detection of a receptacle below the spout; or a third color to indicate an active dispense operation by the dispenser.

Still further examples of the bulk food product gravity-feed dispenser may include a weighing and labeling station. The controller may be configured to communicate at least one of an identification of a bulk material, a dispense event, a customer identification, and an estimated dispense amount to the weighing and labeling station. The weighing and labeling station may further operate to present the received at least one of the identification of a bulk material, the dispense event, the customer identification, and the estimated dispense amount on a graphical display associated with the weighing and labeling station for selection by a customer in completing a weighing and labeling process.

A bulk food product gravity-feed dispenser for use by customers in a retail setting includes a compartment configured to receive and store bulk food material. A spout extends away from the compartment and is open at an outlet. A valve separates the compartment from the spout. The valve is operable to open and close to selectively permit bulk food material to pass from the compartment through the outlet of the spout. A user input sensor is arranged proximate the outlet of the spout. The user input sensor is configured to detect a proximity of a receptacle below the spout and to produce a dispense instruction input signal upon detection. An electromechanical motor is mechanically connected to the valve. The electromechanical motor is configured to move the valve between a closed position and an open position to dispense a portion of the bulk food material from the compartment through the outlet of the spout. A controller is configured to receive the dispense instruction input signal. The controller is configured to operate the electromechanical motor in response to the dispense instruction input signal. The controller is configured to calculate an estimated dispense amount and an estimated dispense price based upon the operation of the valve. A visible light source is arranged proximate the outlet of the spout and is operable by the controller to illuminate an area below the spout to produce a visual indication of the status of the dispenser. A graphical display is operable by the controller to present a visual indication of the estimated dispense amount and the estimated dispense price.

A still further example of a bulk food product gravity-feed dispenser includes a compartment configured to receive and store bulk food material. A spout is connected at one end to the compartment and open at an outlet. A valve separates the compartment from the spout. The valve operates to open and close to selectively permit bulk food material to pass from the compartment through the outlet of the spout. A controller is operable to receive a dispense instruction input. An electromechanical motor is communicatively connected to the controller and mechanically connected to the valve. The controller operates in response to receipt of the dispense instruction input to produce a control signal to the electromechanical motor. In response, the electromechanical motor operates to move the valve between a closed position and an open position to dispense a portion of the bulk food material from the compartment through the outlet of the spout.

DETAILED DISCLOSURE

Figure 1:
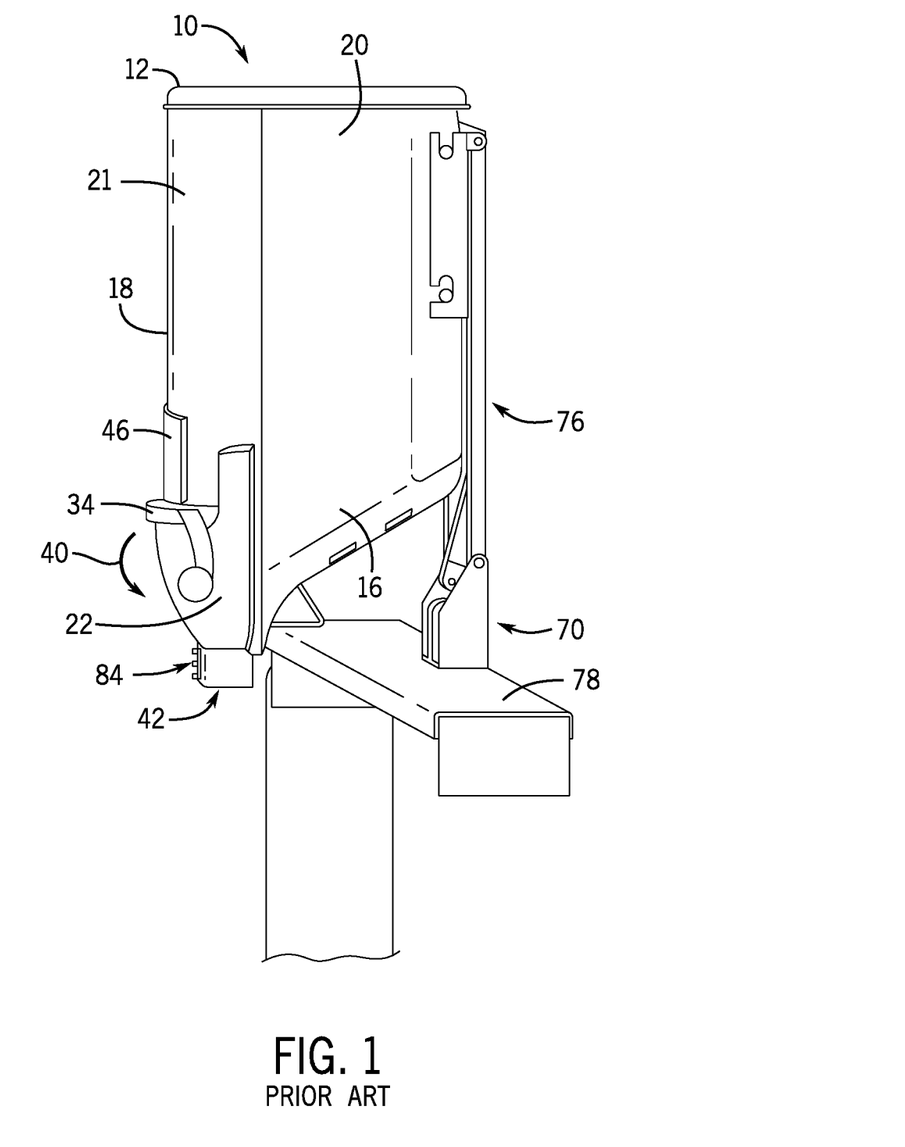
FIG. 1 depicts a prior art bulk dispenser.

FIG. 1 presents an example of a currently available gravity feed bulk dispenser 10. The bulk dispenser 10 is supported by a fixture 70, which may include a movable arm 76 and/or a shelf 78. The fixture may be a built-in installation at the retail location or may be an independent and/or movable structure. The fixture may be configured to support one or more dispensers 10 simultaneously. In FIG. 1 side pieces 16, and a lid 12 interconnect to form an enclosure that defines a first compartment 20. The side pieces 16 and the front piece 18 interconnect to form an enclosure that defines a second compartment 21 and a third compartment 22. In operation, the first compartment 20 is filled with a bulk product to dispense. The second compartment 21 is filled with the same bulk product for display to the customer. The bulk product passes through the third compartment 22 as it is dispensed from the first compartment 20. To inform a customer about the bulk material, a printed display or sign can be held by a display holding device 46 located on an outside surface of the front piece 18.

A customer initiates the flow of the bulk product by actuating handle 34 in the direction of arrow 40. The customer holds a receptacle (not shown) below an outlet 42. The customer holds the handle 34 with one hand while holding the receptacle with the other. Actuation of the handle 34 opens a door (not depicted) internal to the bulk dispenser 10 connecting the first compartment 20 to the third compartment 22. Under the force of gravity, material flows from the first compartment 20, through the third compartment 22, out the outlet 42 and into the receptacle, in that order. After dispensing a desired amount of material into a receptacle, the customer releases handle 34. Biasing devices (not depicted) interact with the front piece 18 and the door to return the handle 34 back to the first position in which the rotating door separates the first compartment 20 from the third compartment 22, i.e. the normally closed position of the handle and door. As previously indicated, other examples of gravity feed bins are known and incorporated by reference in their entireties.

Consumers may use disposable, single-use receptacles (e.g. cups or bags) or may use reusable storage containers to collect the product dispensed from the dispenser. Some consumers and retailers prefer this type of product sale as it generally requires less packaging and therefore less consumer waste. Further, due to supply chain efficiencies, the products can be sold at a more economical price than compared to pre-packaged portions. Lastly, some consumers may prefer the interactivity of the dispense of products from a bulk resource and the control over the volume of the product acquired.

However, consumers and retailers have increased concerns regarding the potential for disease transmission by successive operations of these communally available dispensers. The interactivity of the operation of common bulk dispensers has consumers repeatedly placing their hands on the handles of the dispensers. This could potentially transfer microbes, viruses, and/or other disease vectors from one customer to a subsequent customer using that dispenser. Such transfer could occur across several customers across a series of transactions with the same dispenser. One way to limit this transfer potential is with protocols for cleaning, sanitation, and/or disinfection, which require schedules, supplies, and additional worker actions.

Figure 2:
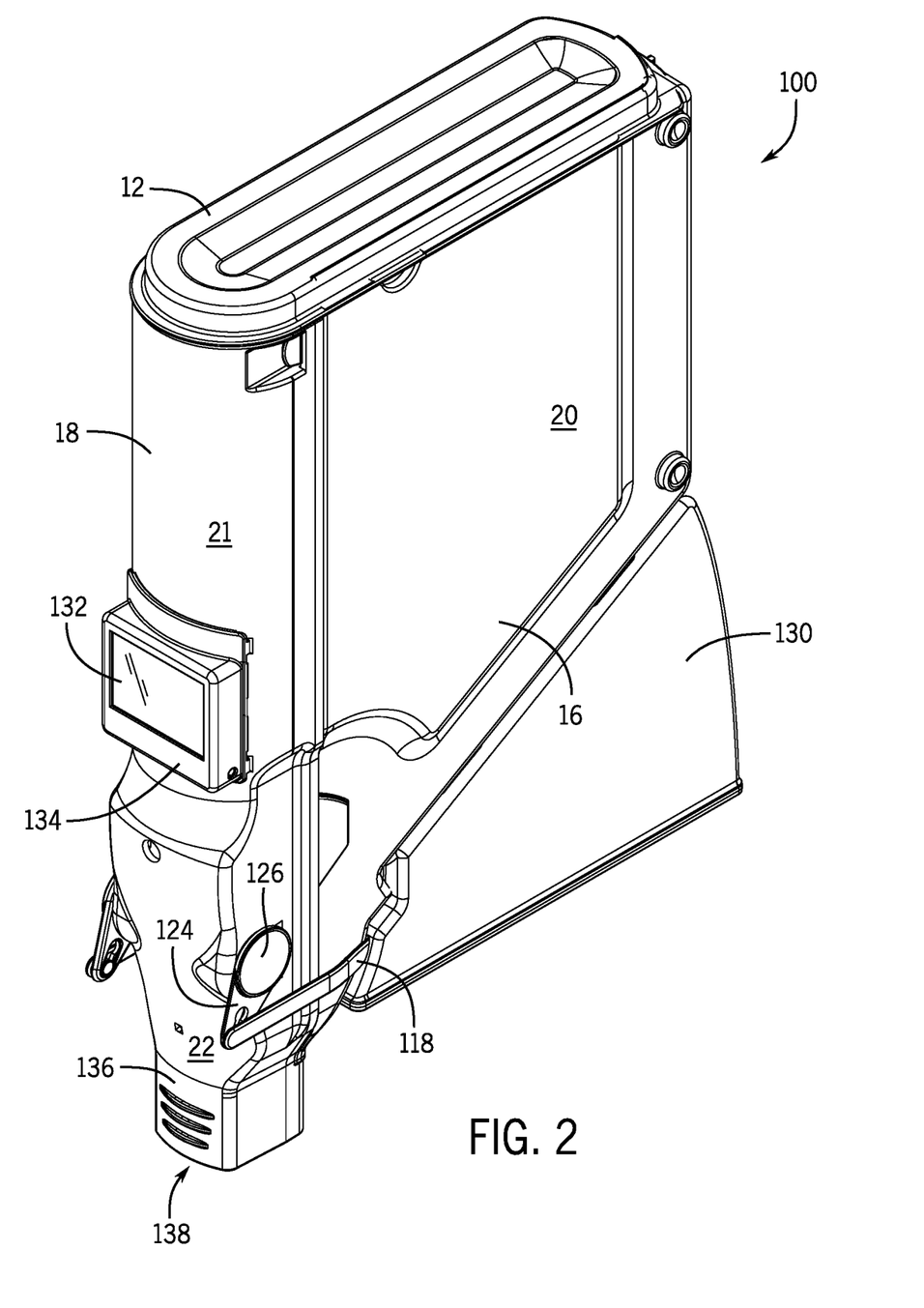
FIG. 2 is a perspective view of a bulk dispenser as described herein.
Figure 3:
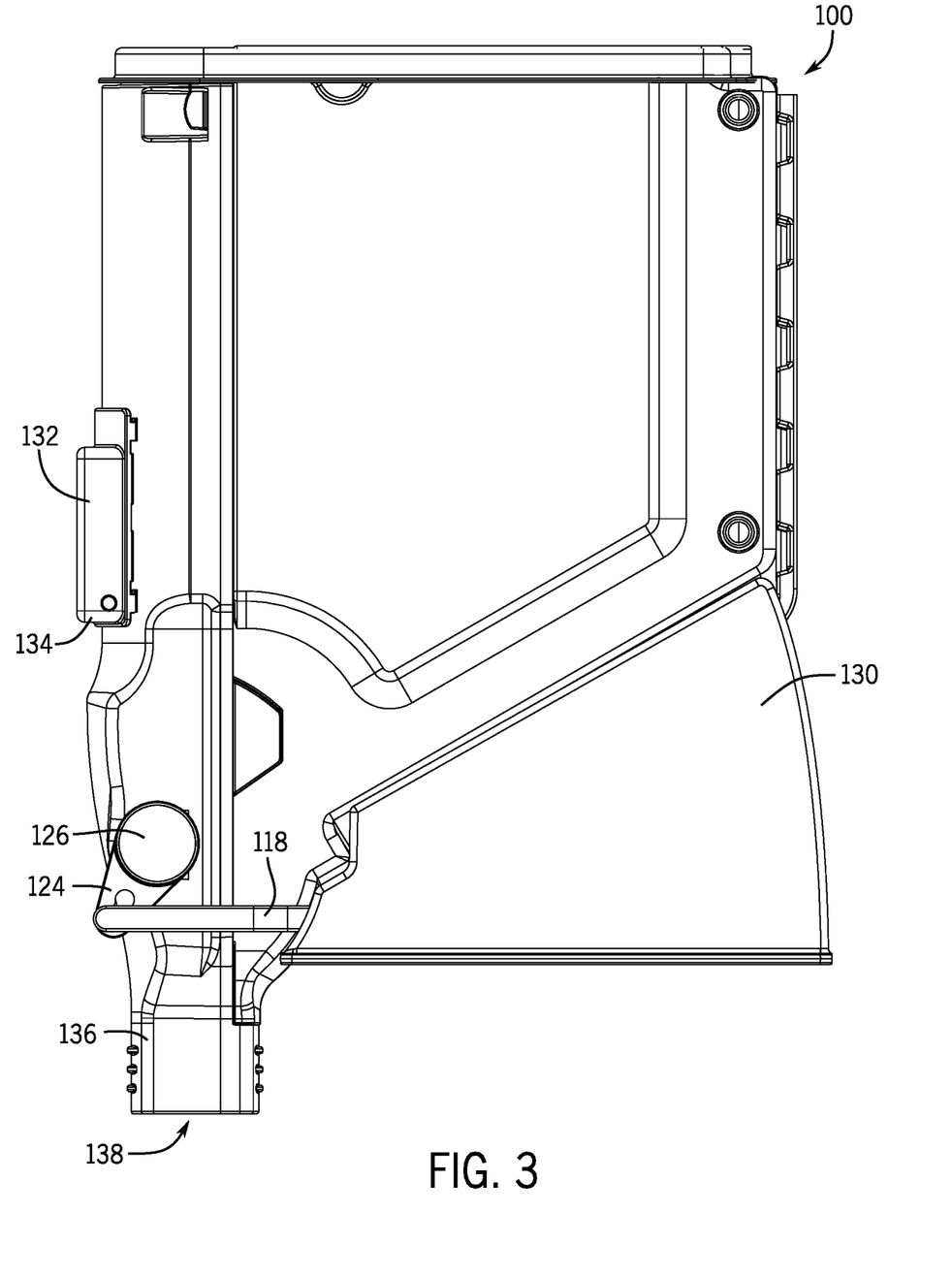
FIG. 3 is a side view of the bulk dispenser of FIG. 2.
Figure 4:
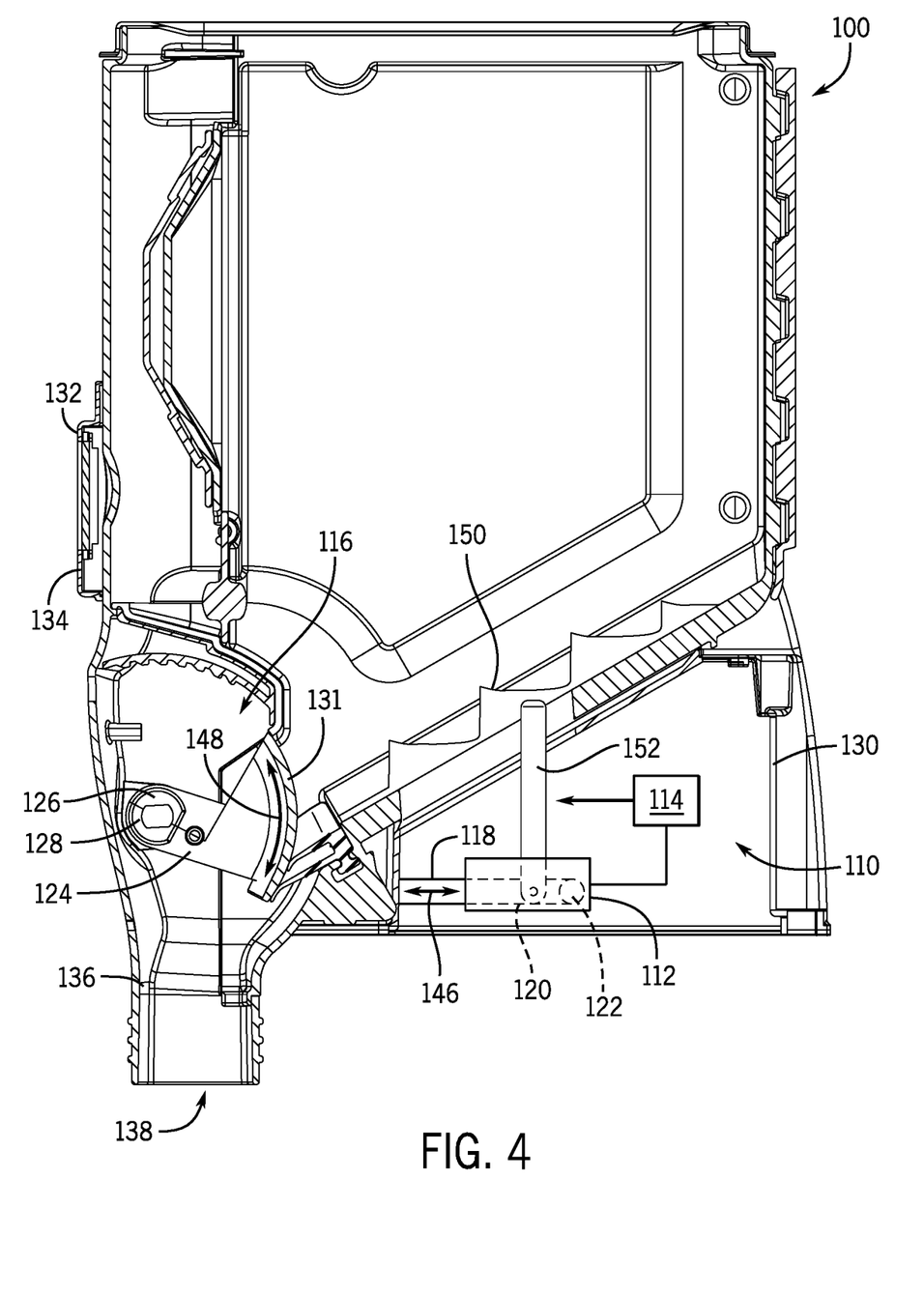
FIG. 4 is a cross-sectional view of the bulk dispenser of FIG. 3 in a closed condition.
Figure 5:
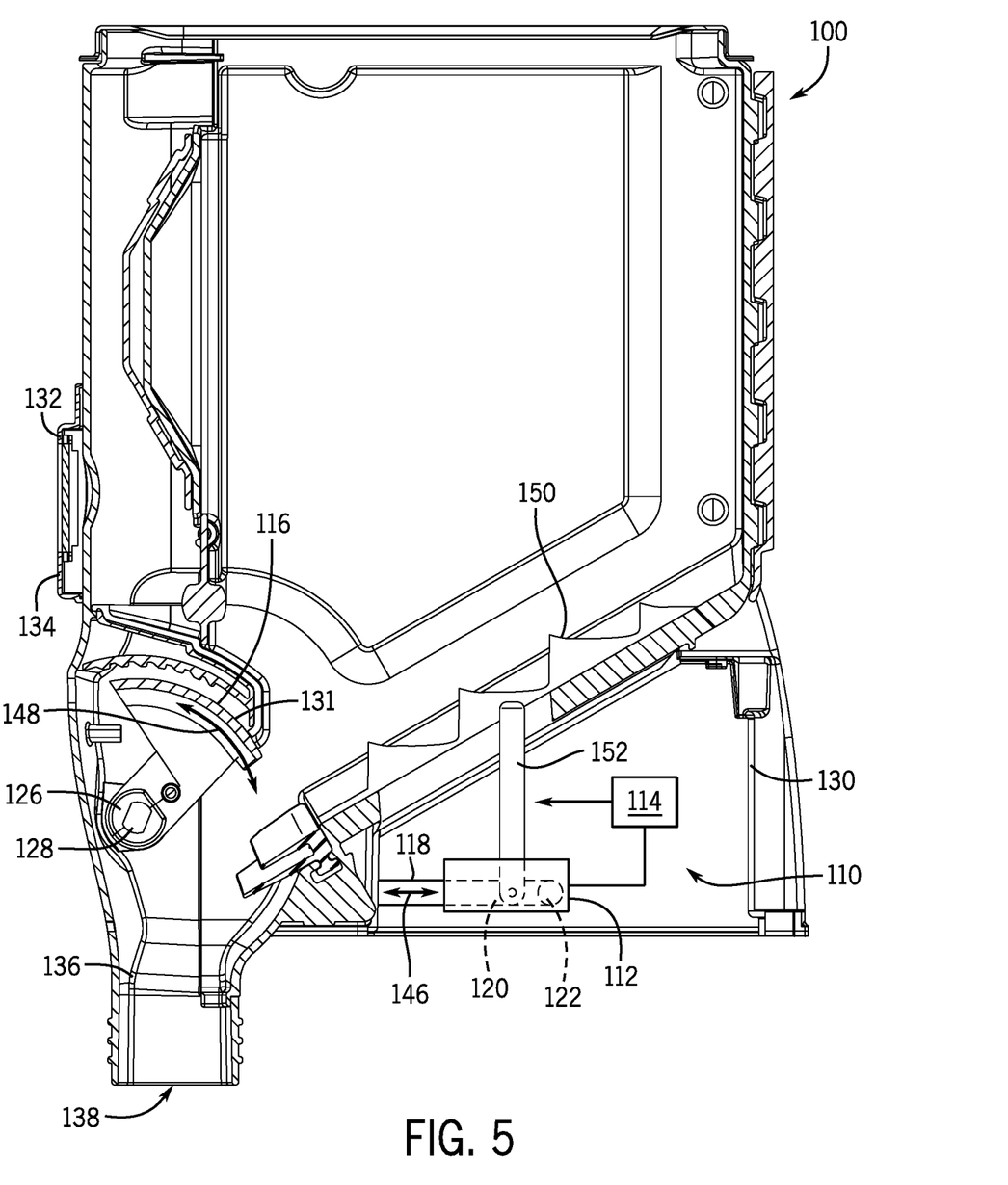
FIG. 5 is a cross-sectional view of the bulk dispenser of FIG. 3 in the open condition.
Figure 6:
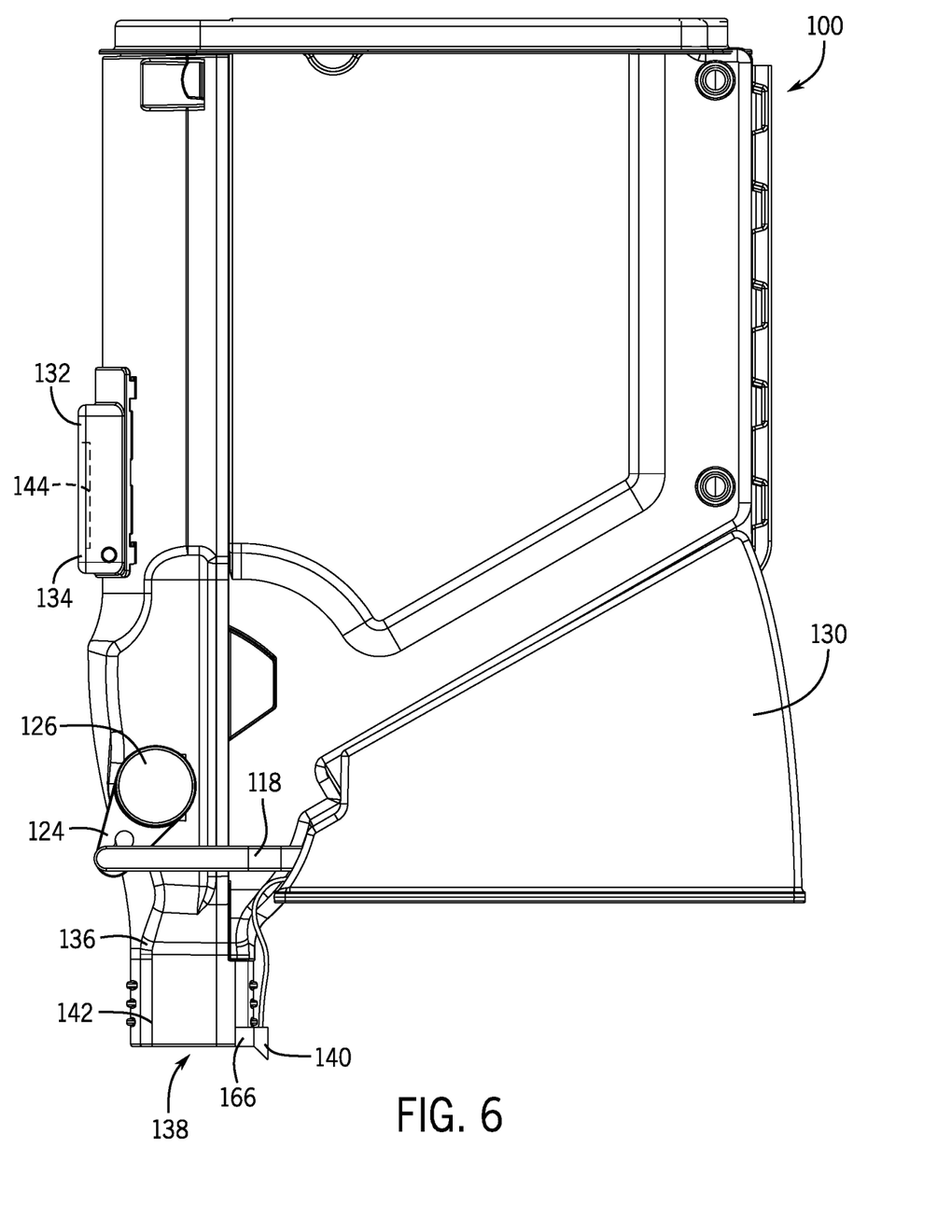
FIG. 6 is a side view of an additional example of a bulk dispenser.

FIG. 2 provides an example of a new gravity feed bulk dispenser 100 that solves the issues of the above concerns with currently available bulk dispensers. Features as presented in FIG. 2, as well as other figures and disclosure herein, may exemplarily be incorporated as a retrofit to existing gravity feed bulk dispensers, or may be newly constructed devices while remaining within the scope of the present disclosure. FIG. 3 is a side view of the same dispenser 100. FIG. 4 is a cross-sectional view of the dispenser 100 of FIG. 3 in a closed condition, while FIG. 5 is a cross-sectional view of the dispenser 100 in an open condition. Examples of the dispenser 100 provided herein may minimize the redundant touch of the dispenser 100 by successive customers.

The dispenser 100 exemplarily includes a similar first compartment 20, second compartment 21, and third compartment 22 as described above. Such first compartment 20, second compartment 21, and third compartment 22 may be similarly defined by side pieces 16, front piece 18, and a lid 12 as described above as well. While it is recognized that these features may remain the same between the dispensers of FIGS. 1 and 2, it is also apparent from the present disclosure that the features of the actuator assembly 110 (e.g. FIGS. 4 and 5) as described herein may be used with other examples of dispensers 100 while remaining within the scope of the present disclosure. The dispenser 100 includes an actuator assembly 110 that provides electromechanical force to operate one or more mechanical components of the dispenser 100 in response to a dispense input.

The actuator assembly 110 exemplarily includes a motor 112 and a controller 114. The controller 114 is exemplarily a single board controller. The controller 114 provides a microprocessor, memory, and communication interfaces for the rest of the system. The controller 114 communicates with the other components of the system as disclosed herein across wired connections, however, in further examples, at least some of these connections may be made wirelessly, using any of a variety of short-range communication protocols, including, but not limited to Bluetooth or ZigBee. Computer-readable code in the form of software or firmware is exemplarily stored in a computer-readable medium of the controller 114 and executed by the microprocessor to carry out the communicative and operational functions as described herein.

The motor 112 is exemplarily an electromotor which may be powered by a corded connection to the mains electricity of a building, for example at a retail store. Further examples of the motor 112 may use electricity from one or more batteries (not depicted) configured to provide electrical power to the system. The motor 112 is configured to provide mechanical force to the system to operate one or more mechanical components as described herein. In an example, the motor 112 is configured to operate a valve 116 of the dispenser 100 between open and closed positions to release portions of the bulk material (which may be a foodstuff) stored within the first compartment 20 of the dispenser 100. The valve 116 is exemplarily actuated by a rotational movement. To achieve this movement, at least one (e.g. two) linkage 118 extend from the motor 112 to the valve 116. A motor arm 120 extends from a rotating shaft 122 of the motor 112 and connects to one end of the linkage 118. An opposite end of the linkage 118 is connected to a valve arm 124 secured to the valve 116, the valve arm 124 and the valve 116 are configured to rotate about a rotation point 126. A valve shaft 128 is oriented at the rotation point 126. The valve shaft 128 may extend between the valve arms 124 or may be a split shaft with a separate portion associated with each of the respective valve arms 124. The mechanical connection between the motor 112 and the valve 116 provided in part by the linkage 118 results in rotation of the valve arms 124 and the valve 116 about the axis of the valve shaft 128, causing the valve 116 to move between a closed position (e.g. FIG. 4) and an open position (e.g. FIG. 5). It will be recognized that other mechanical connections between the motor 112 and the valve 116 are contemplated within the scope of the present disclosure, including, but not limited to, mechanical connections incorporating gears, linear actuators, or drive chains.

In the closed position, the valve 116 selectively occludes a passageway from the compartment 20 through an outlet 138 of the dispenser 100. The valve may typically be positioned anywhere within the third compartment 22 as described above. In examples, a spout 136 may provide an extension between the third compartment 22 and the outlet 138. In the closed position, the valve 116 occludes passage of the bulk material through the outlet 138. In the open position, the valve 116 permits passage of bulk material from the compartment, in a fixed displacement or a flow metering configuration as described in further detail herein.

The valve 116 may exemplarily include a gate 131, for example as depicted in FIGS. 4 and 5. However, it will be recognized that the valve 116 may be embodied in a variety of other components, any of which are within the scope of the present disclosure. The valve 116 may take any of a variety of configurations within the dispenser 100 to operate to control the start, stop, or other metering of the flow of the bulk product held within the dispenser 100. The valve 116 controls the ejection of the bulk product at a rate that is suitable for delivery to the customer. The valve 116 may be configured to operate with minimal lag time between starting and stopping the bulk product dispense and do so with minimal leakage of the bulk material when the valve 116 is in the closed position. The valve 116 generally may operate according to one of two different valve configurations: a fixed displacement valve, an example of which is shown and described with respect to FIG. 9 herein, or a flow metering valve, an example of which is shown and described with respect to FIGS. 4 and 5. In examples, valves of either of these two configurations may include the same or similar components, yet arranged to operate in one of these configurations.

In a fixed displacement valve system, a chamber of a defined volume is alternately opened and closed such that a constant fixed volume of material is sequentially trapped/portioned and then released with each successive operation of the valve. An example of a fixed displacement valve system is shown and described in further detail with respect to FIG. 9 herein. U.S. Pat. No. 5,437,393, incorporated by reference above, provides other general examples of fixed displacement valves. Fixed displacement valve systems segregate a portion of the bulk material from the stored material as a whole and dispense sequential increments of these segregated portions. These sequential increments of portions may be used to estimate and/or monitor the amount of the bulk material that has been dispensed. The valve system may be designed to repeatably produce a portion of a known volume. The portion volume may be defined by the configuration of the dispenser. The portion volume and/or portion mass may be defined based upon the bulk food product to be dispensed. In examples as detailed herein, dispense portion information, including portion volume for various dispenser configurations and portion volume and/or mass for various bulk food products, is stored in a manner communicatively accessible to the controller. Fixed displacement systems may include any of a variety of mechanical systems as described herein, or will be recognized in view of the present disclosure.

A bi-gate fixed displacement valve system, while not depicted, is one example of a fixed displacement valve system. The bi-gate system adds an input gate to an output gate to define a chamber there-between. First, the input gate is opened while the output gate remains closed, until the chamber is filled to the desired measured level. This level may be defined by the volume of the chamber in which the chamber is configured to fill to a particular volume. Secondly, the input gate is closed while the output gate is opened, to evacuate the chamber and dispense the portioned product. In examples, the input gate and the output gate may be separate gating structures, or in other examples, the input gate and the output gates may be combined and provided as portions of a single gating structure that operate to provide the functions of both the input gate and the output gate.

A combined gate fixed displacement valve system incorporates the input gate and the output gate, as described above, into a single moving part. Such a system functions the same as the bi-gate system as described above, except the two gates are moved as a pair in a single motion under the same actuation. In some examples of such a system, both gates may both momentarily exist in a transitional state, wherein both gates are partially open, however, the geometry of the system is such that no significant leakage past both the input gate and the output gate during a single movement occurs.

A rotary gate fixed displacement valve system operates similarly to the bi-gate and combined gate systems as described above, however the gate system revolves to positions between open and closed positions of the input gate and the output gate. This is exemplarily contrasted with a reciprocal pivot as may be used to move the bi-gate or the combined gate as described above.

A screw fixed displacement valve system may use a rotary motion of a screw to draw bulk material axially along the length of the screw, pushed by the flight or flights of the screw. The spacing between the flight(s) move regular volumes with each rotation of the screw.

In a flow metering valve system, for example as shown and described with respect to FIGS. 4 and 5, the valve is positioned between the container or compartment holding the bulk material and the outlet of the dispenser. The valve selectively defines an orifice with a controllable area through which the bulk material can flow to the outlet. The open area of the valve controls the rate at which the bulk material flows to the outlet. The valve can be movable between open and closed positions or may be continuously adjusted between fully open and fully closed positions. Flow metering valve systems may exemplarily be used to compute volume and mass from a calibration-based and/or formula-based flow rate and duration calculation. The flow rate may be derived from a determination of the orifice area size (which may be determined based upon a detected or known position of the valve). A known or measured upstream pressure, weight, or volume of bulk material above the valve is used along with the orifice area size to determine the flow rate. A calibration technique and/or model equations and/or experimentally derived lookup tables for various bulk materials and/or conditions may be used to calculate the flow rate. Measurement of the volume or mass of the bulk material held within the dispenser may be further used in adjustment factors or formula variables in further calculations of the bulk material flow rate.

Flow metering valve systems may be implemented with any of a variety of structures, including with the examples provided herein. Gate valves may include a plate or door which is moved (e.g. raised or lowered) transverse to the outlet. A ball valve may be a cylindrical, elliptical, or spherical element with a cutout in the valve body, which as the valve body rotates within a valve housing, the orifice area through the valve is changed. A butterfly valve includes a plate that may be rotated via a shaft such that the plate is positioned into more axial alignment with the outlet (open) or more transverse across the outlet (closed). An iris valve includes a plurality of plates that are connected to move in a coordinated fashion to radially change the open cross-sectional area of the orifice.

Figure 9:
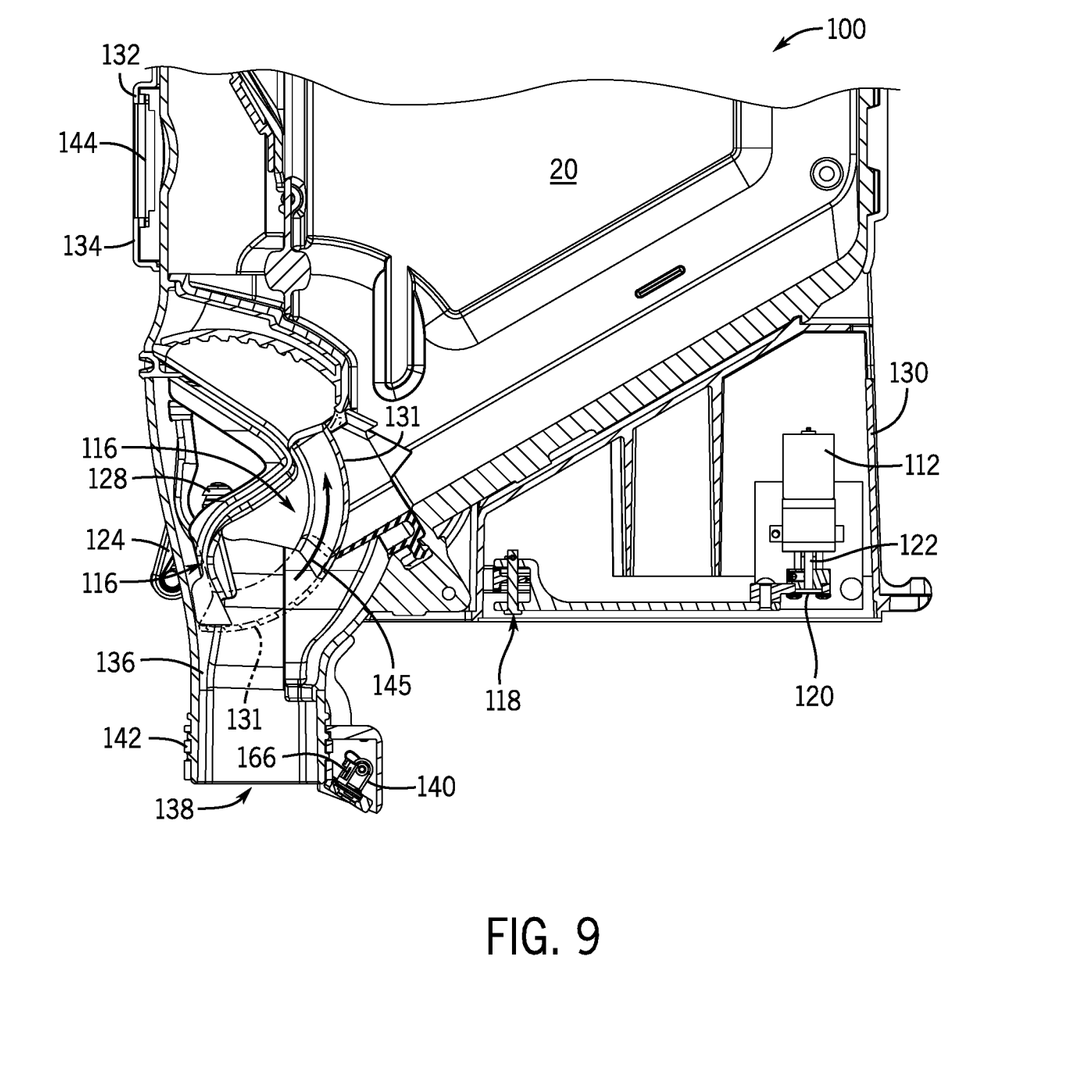
FIG. 9 is a sectional view of an example of the bulk dispenser as described herein.

FIG. 9 depicts an example of the dispenser 100 where the valve 116 is a fixed displacement valve, for example as described above. The valve 116 includes a gate 131 and the gate 131 moves between a closed position (shown) and an open position (dashed lines). In the closed position the gate 131 is positioned across the outlet 138 and the third compartment 22 is filled with the bulk material. The gate 131, for example, but not limiting, is concave and between the gate 131 and the third compartment 22 defines a fixed volume of the bulk material contained therein. As the motor 112 operates to move the valve arms 124 and the valve 116 to the open position, the gate 131 moves in the direction of arrow 145 to the open position (dashed lines). In the open position, the gate 131 occludes passage of bulk material from the first compartment 20 into the third compartment 22. The bulk material that was already within the third compartment 22 is dispensed through the outlet 138, while the gate 131 prevents further passage of bulk material from the first compartment 20 into the third compartment 22 and out the outlet 138.

In examples, the controller 114 receives, during configuration or otherwise, an identification of the configuration of the dispenser 100, for example a volume of the portion dispensed by each cycle of the valve 116 in the fixed-displacement system. In examples, different configurations of valves, for example, the shape of the gate 131, including the concavity of the gate 131 defines a volume within the compartment 22 that fills with the bulk food product to dispense. This configuration information may be stored in a database or lookup table for use during configuration of the controller. Additionally, the controller 114 may be able to access a database or look up table storing portion volumes or masses, or food product densities. The controller receives an identification of the bulk food product to dispense and uses this information to access the associated food product data. The controller 114 uses this information pertaining to the dispenser configuration and the physical properties of the bulk food product to be dispensed, to calculate estimates of cumulative dispense volume, estimated dispense cost, and/or estimated dispense mass as described herein.

In examples, including any of FIGS. 2-9, the actuator assembly 110, and exemplarily the motor 112, linkage 118 and or other components of the actuator assembly 110 are configured to apply the corresponding motive force against the valve 116 to operate the valve 116 between the open and closed positions or to a position therebetween. The actuator assembly 110 thus provides the motive power to operate the valve 116 to carry out a dispense operation of the dispenser 100. In an example, the dispenser 100 includes a dispenser base 130, which is configured to support and hold the compartment 20 of the dispenser 100. The actuator assembly 110 may be exemplarily be located partially or fully within the dispenser base 130, with the dispenser base 130 providing a housing for the actuator assembly. It will be recognized that in examples, the dispenser base 130 may be used when the dispenser is positioned on a shelf, while in still further examples, the dispenser 100 is secured to a movable arm 76 (see FIG. 1). In such examples, a mounting fixture of related construction to the dispenser base 130 incorporated into the shelf or movable arm may provide a housing to some or all of the actuator assembly 110, while also providing an interface to secure the actuator assembly 110 to the compartment. In an example, the dispenser base 130 may be secured to or integral with a fixture 70 (see FIG. 1) and the compartment 20 is releasably connectable and/or removable from the dispenser base 130.

The dispenser 100 is arranged to move the valve 116 between open and closed positions by operation of the valve arm 124 by the linkage upon receiving an input instruction to dispense. In an example, the dispenser 100 includes a user interface 132 that is communicatively connected to the controller 114 by wired or wireless connection. The user interface 132 incorporates a user input sensor 134. In touch-enabled devices, this may be a graphical user interface (GUI) button configured to receive a touch-input to initiate a dispense. In a touchless operation, the user input sensor 134 may be a motion sensor, for example one that optically detects motion and/or proximity within a predetermined distance of the sensor. Such sensors may use infra-red (IR), although other options will be recognized in the art, including cameras and associated digital vision processing. In still other examples, the user input sensor 134 may incorporate radio frequency (RF) technology wherein the customer uses an RFID tag, for example encoded with a customer ID moved into proximity with the user input sensor to touchlessly initiate a dispense.

In another example, the spout 136 or the outlet 138 may be fitted with a sensor 140. The sensor 140 may, for example, be a ranging sensor or a proximity sensor. The sensor 140 may be implemented with an infrared or an ultrasonic sensor. The sensor 140 may further include or use a camera and computer vision processing system. Any of these or other arrangements of the sensor 140 may be configured to detect the presence of a receptacle, for example a bag or a jar, in a proper position below the outlet 138 to receive the bulk material once it is dispensed. The sensor 140 may incorporate an IR time of flight sensor. The sensor 140 may be communicatively connected to the controller 114 by wired or wireless configurations. The sensor 140 may use IR or visible light to detect the presence and/or position of a receptacle below the outlet 138. In operation, the controller 114 may wait for a predetermined time (e.g. 200 ms, 500 ms, or 800 ms) of similarly detected presence before initiating a dispense to avoid inadvertent or unintentional dispenses. In still further examples, the controller 114 may require both a presence detected by the sensor 140 and an input detected by the user input sensor 134 before initiating a dispense. In still further examples, the user input sensor 134 may be a physical button or a lever positioned within the area below the outlet 138. Actuation of the user input sensor 134, for example by engagement of the user input sensor 134 with the receptacle may provide a signal to the controller 114 and the controller 114 may operate to initiate a dispense operation in response to the signal from the user input sensor 134 and/or the sensor 140.

An adapter ring 142 may be configured to secure about the spout 136 at the outlet 138. The sensor 140 may be incorporated into the adapter ring 142, for example, the adapter ring 142 may be injection molded and a housing for the proximity sensor molded into the adapter ring during manufacturing. The adapter ring 142 may further be constructed in two interlocking pieces to facilitate securement of the adapter ring 142 to the spout 136. In a still further example, the adapter ring 142 may be made of an elastomeric material that helps to grip or hold a plastic bag against the spout 136 to limit spillage of the bulk material. The sensor 140 may thus be positioned in the spout 136, adapter ring 142, the dispenser base 130, or at a position below the outlet 138 of the spout 136. Other positions of the sensor 140, including those separate from the dispenser or mounted to dispenser support structure or shelf, will be recognized within the scope of this disclosure.

The user interface 132 may further include a graphical display 144 which is operated by the controller to present a GUI. The GUI presented on the graphical display 144 may provide one or more of a variety of functions. The GUI may present an identification of the bulk material within the dispenser, a volumetric or by weight cost of the bulk material, a dispense portion size or flow rate, a dispense estimate and an estimated cost of the estimated dispense. The graphical display 144 may further be operated to present a GUI with instructions for how to operate the dispenser, images, branding, or logos of the bulk material and/or the retailer. In doing so, the controller may access stored dispense information, for example representative of a configuration of the dispenser and/or representative of the bulk food product to dispense, including dispense/portion volumes and mass and/or density of each bulk food product. Upon a configuration of the controller, the controller may have this information accessible to perform the calculations above with an identification of the dispenser configuration and/or the bulk food product to dispense.

The dispenser 100 is filled with a bulk material. In an example, the controller 114 further can receive an user input through the user interface 132 or by RFID communication with an RFID tag of a packaging for the bulk material to inform the controller 114 of the identity of the bulk material. This may include a product look-up (PLU) number and/or a stock-keeping unit (SKU) number that identifies the bulk material. Based upon the identified bulk material, the controller may operate the motor during the dispense in different manners, for example, the portion size, the orifice size in a flow metering valve, or the use of agitation.

Figure 7:
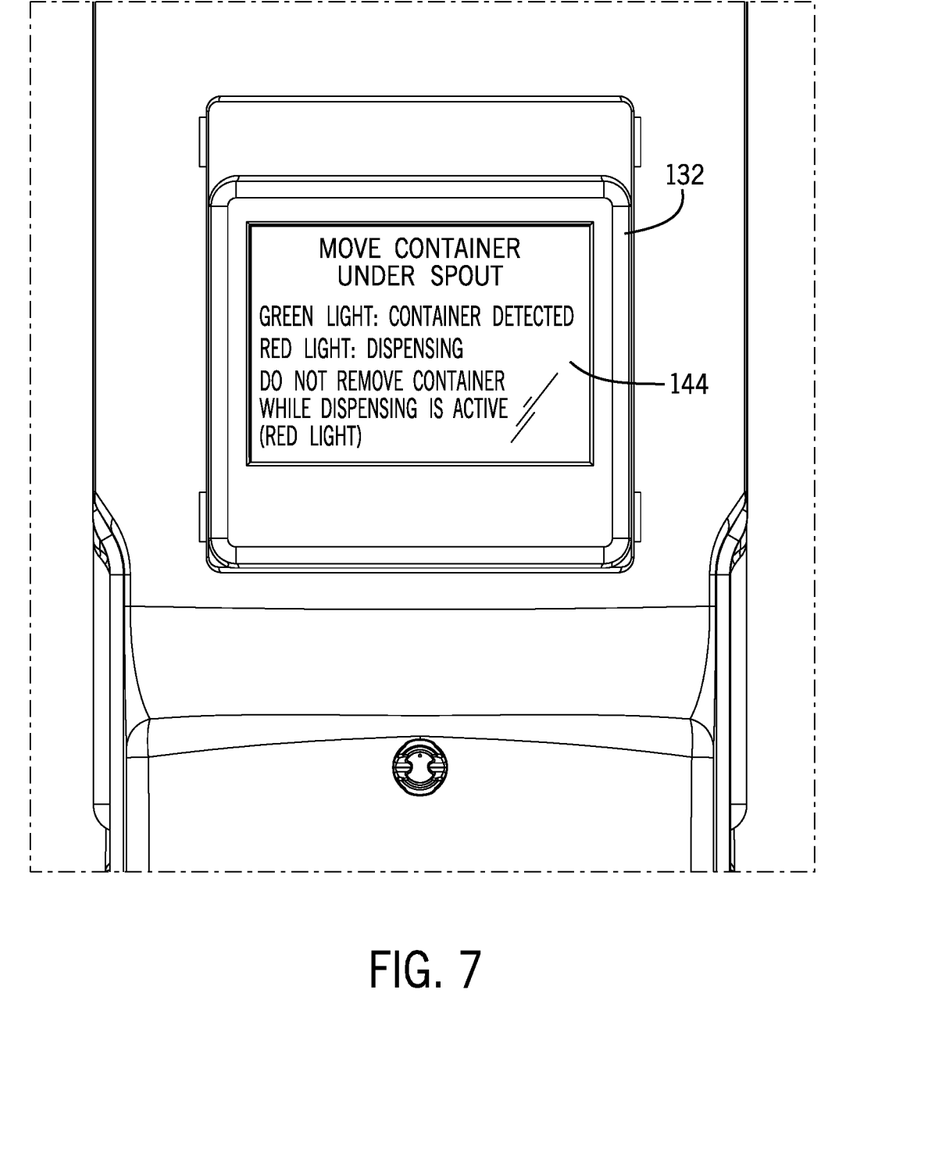
FIG. 7 is a detailed view of an example of the graphical display presenting a graphical user interface.

When a user approaches the dispenser, the user may observe the product and price identification and dispense instructions presented on the graphical display 144. As depicted in FIG. 7, the GUI presented on the graphical display 144 may operate to provide operational instructions to the user. In the example shown in FIG. 7, the user is instructed to "Move Container under Spout." This movement is detected by the sensor 140 as described above. It will be recognized that in other examples, the user may provide at least one dispense input through interaction with the user input sensor 134, which may be presented in the user interface 132 as described above. In an example, the graphical display 144 or another visual indicator (e.g. LED lights) or audio indicator may provide feedback to the user that the dispenser is about to initiate a dispense. In the example provided in FIG. 7, the graphical display 144 presents information that a "Green Light" indicates the detection of a container in the dispense area below the outlet 138 of the spout 136. While a "Red Light" indicates that the bulk material is being dispensed and the container should not be moved. In still further examples, the graphical display 144 or other visual indicators as described herein may operate to present an operational status including a stand-by, receptacle detected, active dispensing, dispense operation reset, or fault condition statuses of the dispenser.

Upon receiving the dispense instruction, the controller 114 operates the motor 112 to move the linkage 118 in the direction of arrow 146 to move the valve 116 in the direction of arrow 148 into an open position. As described above, depending upon the arrangement of the valve 116, the valve may move to a fully open position to dispense a withheld portion of the bulk material, as shown in FIG. 9. In another example, the valve 116 may be moved in the open direction to a partially or fully open position to control a flow of the bulk material out of the dispenser. In an example, a maximum dispense time may be defined in which, even in a flow metering dispensing configuration, the dispenser terminates the dispense, so as to limit the potential for overflow or spillage. When the dispense of a portion is terminated or the flow metering ended, the controller 114 operates the motor 112 to move the valve 116 to the closed position.

Figure 8:
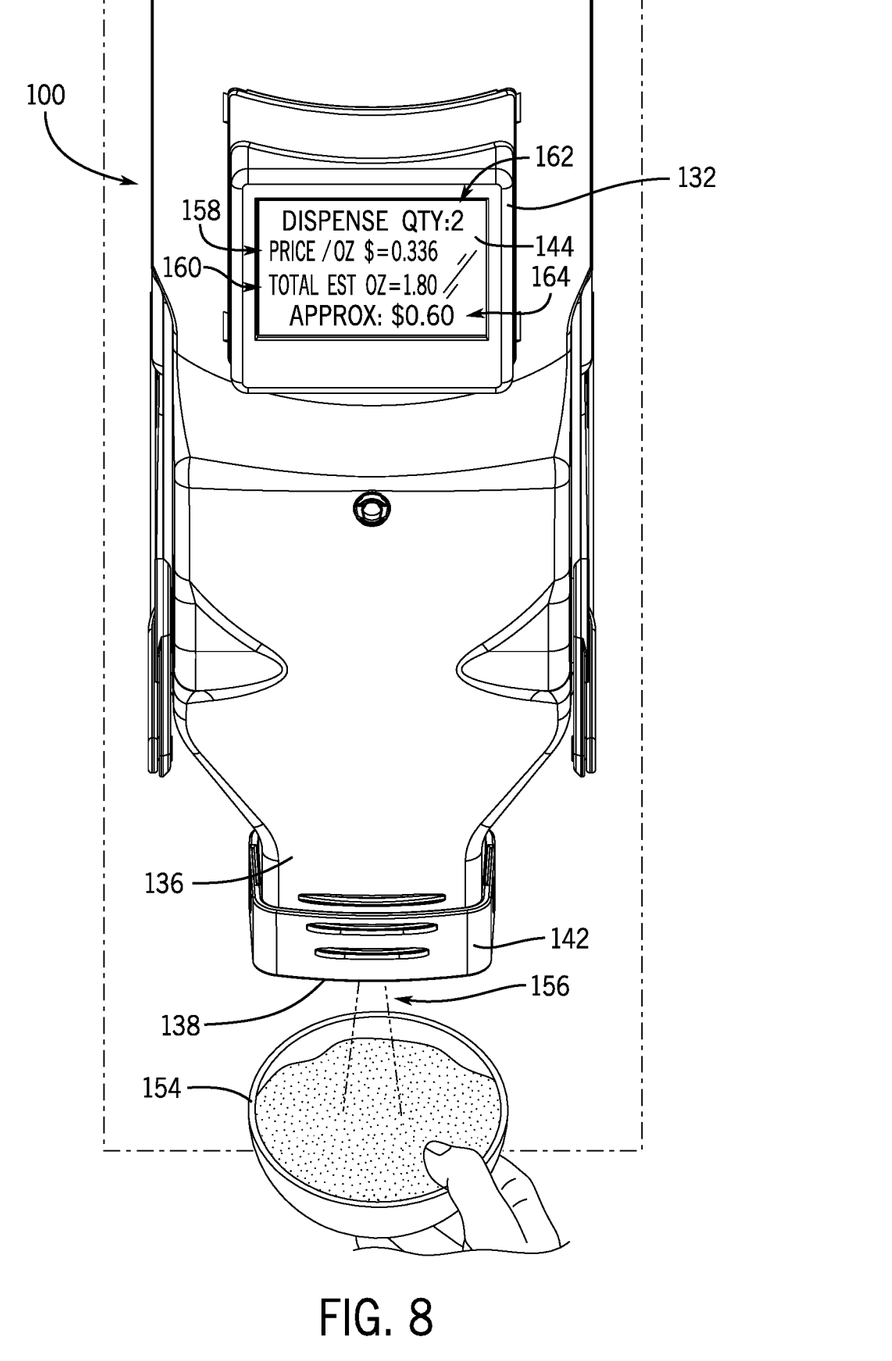
FIG. 8 is a detailed view of an example of the bulk dispenser during a dispense operation.

FIG. 8 presents an example of the dispenser 100 operating during a dispense operation. A container 154, depicted as a bowl, but which may be a jar, box, bag or other receptacle, is positioned below the outlet 138 of the spout 136 of the dispenser 100. A light source (e.g. light source 166 in FIG. 6) which may, for example, be secured to the adapter ring 142, the spout 136, or the dispenser base 130, projects illumination 156 onto the container 154 in the dispensing area. As noted with respect to FIG. 7, the light source may operate to project illumination 156 in, for example, one color (e.g. green) to indicate that the container 154 is detected, and, for example, in another color (e.g. red) to indicate that the bulk material is actively being dispensed. This operational feedback may also or alternatively be provided in audible indications and/or be presented visually in the graphical display 144 or other dedicated indicator lights secured to the user interface 132.

As previously noted, initiation of a dispense operation may result in operation of the dispenser 100 by the controller 114 to dispense a portion or defined quantity of the bulk material. In a fixed displacement valve described above, this is the volume of the dispense portion. In a flow metering valve, this may be defined flow conditions and duration to dispense a portion while limiting any potential for overflow or over-dispense. In such examples, the graphical display 144 may operate to present a GUI with dispense information including an identification of the product being dispensed, a price (e.g. per ounce or per dispense portion) 158 and a total estimated dispense amount 160. It will be recognized that estimates of dispense portion amounts may be obtained for different dispenser and valve combinations and bulk material properties. It is further recognized that in some embodiments, such estimated dispense amount may be for customer information purposes and not measure for trade purposes, while in other examples, the dispenser 100 may integrate measure for trade capabilities. In examples, the controller 114 receives, during configuration or otherwise, an identification of the bulk food product to be dispensed from the dispenser 100. With an identification of the bulk food product, the product dispense portion volume, mass, and/or density may be accessible to the controller, for example, in a database or lookup table that may be stored local to the controller, or stored remotely from the controller, for example across a communications network. Upon a configuration of the controller, the controller may have this information accessible to perform the calculations above with an identification of the dispenser configuration and/or the bulk food product to dispense.

As noted, upon the initiation of a dispense operation, the dispenser 100 may operate to dispense a single dispense portion. After this, the dispenser 100 may enter an interlock routine to prevent further dispense until an additional input is received. In an example, the graphical display 144 may be operated to present a GUI with instructions to remove and reposition the container 154 below the spout 136. Detection of the container reintroduced to the position below the spout 136 by the sensor 140 will initiate a dispense operation to dispense a further dispense portion. The graphical display 144 may be operated to present a GUI with a dispense quantity count 162 and further update the total estimated dispense amount 160. From the price of the bulk material and the estimated dispense, the controller 114 can operate the graphical display to present an estimated total price 164 within the GUI. It will be recognized that since a dispense event with a user may extend across multiple dispense operations of the dispenser 100, the controller 114 may operate to make a determination of when a dispense event has started and stopped. In examples, the controller 114 may use a timer or clock and as long as a subsequent dispense operation occurs within a predetermined time of a previous dispense operation, such dispense operations are included as a single dispense event. Should the timer or clock time out of this time threshold, then the dispense event is deemed concluded and the dispense quantity count 162, estimated dispense amount 160, and estimated total price 164 are reset. The controller 114 may operate the graphic display 144 to return to the standby GUI, e.g. as presented in FIG. 7. In still other examples, additional information, for example user inputs, detection of with proximity, ranging or computer vision systems, RFID detection or others may be used to determine if a user is still in a position to interact with the dispenser 100 and incorporate this information into the determination of a completed dispense event.

In examples, the compartment 20 may be configured with an agitator 150. An optional linkage 152 may extend from the motor 112 and operably connected to the agitator 150. In the dispense of bulk materials that require agitation, operation of the motor 112 by the controller 114 may further operate the agitator as the valve 116 moves between the closed and open positions.

In addition to the operation and structures above, examples of the dispenser 100 may include other features and functions as well. In a system with a fixed displacement valve, each cycle of the valve dispenses an amount of the bulk material that can be estimated and multiplied by the number of cycles to produce an estimated dispense amount over monitored time periods (e.g. customer interaction, time of day, daily, weekly, monthly, yearly, etc.). Similarly, in a system with a flow metering valve, the position of the flow metering valve corresponds to an estimated bulk product flow rate, which can be multiplied by the open valve open time to produce an estimated dispense amount over similar time periods. It will be recognized that such calculations may be performed in other manners, including integral math or lookup tables. Such functions can be performed using the controller 114 with inputs of the control signals to the motor 112 for the valve status information.

In still further examples, the controller 114 is communicatively connected to one or more other computers or devices. Such communicative connections may be performed through wired or wireless communicative connections. The communicative connections may be to local devices or to remotely located devices. The controller 114 may share data with other computers or devices to send or receive data from them. In examples, this data may be settings or parameters used for operation of the devices. In other examples, such information may document or monitor use of the device. Such shared data may include PLUs or SKUs of the bulk material stored and dispensed from the dispenser, a density of the bulk material, item identification/pricing information, or system calibration parameters, fault codes, or other maintenance information.

In still further examples, the dispenser may communicate with a weighing/pricing/labeling station. In the retail setting, particular standards and requirements must be met to weigh and label bulk goods for sale, often requiring a separate weighing and/or labeling station which exemplarily includes a scale and a label printer. In an example, the controller 114 may communicate to the weighing and labeling station: an identification of the bulk product dispensed, a time of the dispense, and/or an estimated dispensed amount. When the user takes the dispensed bulk product in the receptacle to the weighing and labeling station, the user may be presented with the recent dispenses from the surrounding dispenses from which to make a selection. This can avoid customer confusion or difficulty with relaying PLUs or SKUs from the dispenser to the weighing and labeling station. The user selects the corresponding dispense information and the weighing and labeling station operates to produce an "official" measurement and print the label for check out. In addition, in an example, wherein the customer has produced an identification, for example by using an RFID tag to initiate a dispense, the customer identification can be communicated from the controller 114 to the weighing and labeling station, and the customer can select their name or identification to complete the weighing and labeling process.

It will be recognized that in examples as provided herein, the controller, sensors, graphical display, linkages, and electromechanical motor may be configured for external contact with the compartment and/or spout of the dispenser 100. In such examples, the food-contact portions of the dispenser are not modified in response to incorporation of those components as described herein. This may facilitate retrofit incorporation of features disclosed in the present application to provide such functionality to existing dispensers, including, but not limited to, those as described above with respect to FIG. 1.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives, and modifications are possible within the scope of the appended claims.

This written description uses examples to disclose the invention, including the best mode, and also to enable any person skilled in the art to make and use the invention. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A bulk food product gravity-feed dispenser for use by customers in a retail setting, the gravity-feed dispenser comprising:
   a compartment configured to receive and store bulk food material;
   a valve separating the compartment from an outlet, the valve operable to open and close to selectively permit bulk food material to pass from the compartment through the outlet;
   a controller configured to receive an identification of the bulk food material in the compartment and to receive a dispense input, the controller configured to operate the valve based upon the received dispense input and to lookup food product data using the identification of the bulk food material, and the controller configured to, upon operation of the valve, calculate an estimated dispense volume from the valve operation and the food product data and to calculate an estimated dispense price based at least in part upon the estimated dispense volume and the food product data; and
   a graphical display operable by the controller to present a visual indication of an estimated dispense amount and the estimated dispense price, wherein the estimated dispense amount is the estimated dispense volume or an estimated dispense weight calculated from the estimated dispense volume.

2. The bulk food product gravity-feed dispenser of claim 1, further comprising an electromechanical motor communicatively connected to the controller and mechanically connected to the valve, wherein the controller operates the electromechanical motor to move the valve between a closed position and an open position to dispense a portion of the bulk food material from the compartment through the outlet.

3. The bulk food product gravity-feed dispenser of claim 2, wherein the controller and the electromechanical motor are located within a dispenser base defining a housing, the dispenser base configured to secure to the compartment, and wherein the electromechanical motor is connected to the valve by a linkage.

4. The bulk food product gravity-feed dispenser of claim 1, wherein the valve is a flow metering valve and the controller is configured to calculate the estimated dispense volume from a measured duration in which the valve is in the open position and the food product data comprises a predetermined mass flow rate of the bulk food material.

5. The bulk food product gravity-feed dispenser of claim 1, wherein the valve is a fixed displacement valve and the portion is a fixed volumetric portion dispensed upon each actuation of the valve, and wherein the controller is configured to calculate the estimated dispense volume from the fixed volumetric portion and a count of sequential actuations of the valve.

6. The bulk food product gravity-feed dispenser of claim 5, further comprising a user input sensor configured to receive the dispense instruction input, wherein the user input sensor is configured to receive a user gesture or proximity, is configured as an RFID sensor to receive a signal from an RFID tag associated with a customer, or is configured as a physical or graphical user interface button.

7. The bulk food product gravity-feed dispenser of claim 5, further comprising:
   a spout extending away from the compartment and open at the outlet; and
   a sensor arranged proximate the outlet of the spout, wherein the sensor produces the dispense instruction input.

8. The bulk food product gravity-feed dispenser of claim 7, wherein the sensor comprises an infrared sensor configured to detect a proximity of a receptacle below the spout.

9. The bulk food product gravity-feed dispenser of claim 7, wherein the sensor comprises one of a ranging sensor, a proximity sensor, or a camera and computer vision processing system operating on the controller.

10. The bulk food product gravity-feed dispenser of claim 7, further comprising a visible light source as a visual indicator of the status of the dispenser, wherein the visible light source is arranged proximate the outlet of the spout of the dispenser and configured to illuminate an area below the spout.

11. The bulk food product gravity-feed dispenser of claim 10, further comprising an adapter ring removably secured about the spout, wherein the adapter ring comprises the sensor and the visible light source and positions the sensor and the visible light source proximate the outlet of the spout.

12. The bulk food product gravity-feed dispenser of claim 1, further comprising a visible light source and the controller is configured to operate the visible light source as a visual indicator of the status of the dispenser.

13. The bulk food product gravity-feed dispenser of claim 12, further comprising a spout extending away from the compartment and open at the outlet, wherein the visible light source is connected to the spout and is configured to illuminate an area below the outlet.

14. The bulk food product gravity-feed dispenser of claim 13, wherein the visible light source is operable by the controller to produce:
- a first visual indication of a standby operation of the dispenser;
- a second visual indication of the detection of a receptacle below the outlet; and
- a third visual indication of an active dispense operation by the dispenser.

15. A bulk food product gravity-feed dispensing system comprising the dispenser of claim 1, and further comprising:
- a weighing and labeling station comprising a scale and separated from the dispenser, wherein the controller is configured to communicate at least one of an identification of a bulk material, a dispense event, a customer identification, and the estimated dispense amount to the weighing and labeling station.

16. The bulk food product gravity-feed dispensing system of claim 15, wherein the weighing and labeling station further operates to present the received at least one of the identification of a bulk material, the dispense event, the customer identification, and the estimated dispense amount on a graphical display associated with the weighing and labeling station for selection by a customer in completing a weighing and labeling process.

17. The bulk food product gravity-feed dispenser of claim 1, further comprising:
- an agitator movably positioned within the compartment, wherein the agitator is configured for mechanical attachment to the electromechanical motor; and
- a linkage that mechanically connects the electromechanical motor to the agitator, such that operation of the electromechanical motor in response to the controller to operate the valve between the closed and open positions further operates the agitator to move within the compartment.

18. A bulk food product gravity-feed dispenser for use by customers in a retail setting, the gravity-feed dispenser comprising:
- a compartment configured to receive and store bulk food material;
- a spout extending away from the compartment and open at an outlet;
- a valve separating the compartment from the spout, the valve operable to open and close to selectively permit bulk food material to pass from the compartment through the outlet of the spout;
- a user input sensor arranged proximate the outlet of the spout, wherein the user input sensor is configured to detect a proximity of a receptacle below the spout and to produce a dispense instruction input signal upon detection;
- an electromechanical motor mechanically connected to the valve, the electromechanical motor configured to move the valve between a closed position and an open position to dispense a portion of the bulk food material from the compartment through the outlet of the spout;
- a controller configured to receive the dispense instruction input signal, configured to operate the electromechanical motor in response to the dispense instruction input signal, configured to receive an identification of the bulk food material in the compartment and to lookup food product data using the identification of the bulk food material, the controller configured to calculate an estimated dispense volume based upon the operation of the valve and the food product data, and configured to calculate an estimated dispense price based at least in part upon the estimated dispense volume;
- a visible light source arranged proximate the outlet of the spout and operable by the controller to illuminate an area below the spout to produce a visual indication of the status of the dispenser; and
- a graphical display operable by the controller to present a visual indication of the estimated dispense amount and the estimated dispense price, wherein the estimated dispense amount comprises the estimated dispense volume or an estimated dispense weight calculated from the estimated dispense volume.

19. The bulk food product gravity-feed dispenser of claim 18, wherein the valve is a fixed displacement valve and the portion is a fixed volumetric portion dispensed upon each actuation of the valve, and wherein the controller is configured to calculate the estimated dispense volume from the fixed volumetric portion and a count of sequential actuations of the valve.

* * * * *